United States Patent
Korczynski et al.

(10) Patent No.: US 7,396,262 B2
(45) Date of Patent: Jul. 8, 2008

(54) SEALED COMPACT POWER DISTRIBUTION MODULE

(75) Inventors: Jacek M. Korczynski, Niles, IL (US); Kerri M. Moore, Schaumburg, IL (US); Eric D. Ude, Warren, OH (US); Richard E. Kriss, Chicago, IL (US); Frank Maine, Park Ridge, IL (US)

(73) Assignee: Cooper Technologies Company, Houston, TX (US)

( * ) Notice: Subject to any disclaimer, the term of this patent is extended or adjusted under 35 U.S.C. 154(b) by 179 days.

(21) Appl. No.: 11/010,229

(22) Filed: Dec. 10, 2004

(65) Prior Publication Data

US 2006/0128230 A1  Jun. 15, 2006

(51) Int. Cl.
  *H01R 11/09* (2006.01)
(52) U.S. Cl. .............. 439/723; 439/718; 439/271; 439/620.27; 439/76.2; 439/949; 174/138 F; 220/326
(58) Field of Classification Search ............. 439/723, 439/724, 718, 621, 135, 271, 76.2, 949; 220/326, 220/306; 174/138 F
See application file for complete search history.

(56) References Cited

U.S. PATENT DOCUMENTS

| 4,959,018 | A | * | 9/1990 | Yamamoto et al. ......... 439/76.1 |
| 5,280,135 | A | * | 1/1994 | Berlin et al. ............... 174/67 |
| 5,702,021 | A | * | 12/1997 | Ito ............................ 220/326 |
| 5,752,856 | A | * | 5/1998 | Boutin et al. ............... 439/621 |
| 5,777,843 | A | * | 7/1998 | Younce ...................... 361/641 |
| 6,227,913 | B1 |  | 5/2001 | Davis et al. |
| 6,431,880 | B1 |  | 8/2002 | Davis et al. |
| 6,464,522 | B2 | * | 10/2002 | Osawa et al. ................ 439/271 |
| 6,969,285 | B2 | * | 11/2005 | Kobayashi ................. 439/723 |

OTHER PUBLICATIONS

Press Release: Cooper Bussmann Automotive Products Adds Dual Vehicle Electrical Center (DVEC) With Programmable Power Distribution to Product Line; Jun. 2003 (3 pgs.).
The TRA Fuse Block Modular Rear Terminal ATC Fuse Block Series 15710 available at: http://www.bussauto.com.uk/new_products.htm.
The TRA Fuse Block Modular Rear Terminal ATC Fuse Block Series 15710 available at: http://www.busscc.com.
The TRA Fuse Block Modular Rear Terminal ATC Fuse Block Series 15710 available at: http://www.bussauto.com.

* cited by examiner

*Primary Examiner*—Truc T. Nguyen
*Assistant Examiner*—Xuong Chung-Trans
(74) *Attorney, Agent, or Firm*—King & Spalding LLP (57) ABSTRACT

A sealed power distribution module includes a nonconductive body defining a terminal receptacle, a barrier seal engaged to and surrounding the body adjacent the receptacle on an exterior surface of the body, a terminal element grid fitted within the receptacle, and provisions for installing commercially available sealed terminals to complete the wiring. The grid is engaged to the body at a location interior to the barrier seal. The power distribution module may also include one or more bus bar assemblies oriented such that simultaneous switching of relay packages is possible.

21 Claims, 7 Drawing Sheets

SEALED COMPACT POWER DISTRIBUTION MODULE

BACKGROUND OF THE INVENTION

This invention relates generally to power distribution blocks or terminal blocks and, more particularly, to power distribution blocks for vehicle electrical systems.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and opens one or more circuits through the fuse to prevent electrical component damage Power distribution blocks and terminal blocks are sometimes utilized to collect a plurality of fuses in a central location in an electrical system. Conventionally, fuse blocks include individually wired circuits within the block for power input. As such, when it is desired to power more than one circuit with the same power source, a jumper is installed for this purpose. Installation of jumpers, however, is costly, labor intensive, and time consuming. In addition, added circuits require the use of larger gauge wiring in order to handle the additional current load. Accommodation of additional loads and auxiliary circuits with conventional fuse blocks used in, for example, vehicle electrical systems, is therefore difficult. Electrical systems of many vehicles now include expanded electrical systems to accommodate additional vehicle features and entertainment devices. Some types of vehicles, for example, watercraft, buses, and recreational vehicles include separately powered auxiliary loads for such purposes, and wiring these loads to auxiliary power sources adds to the complexity and difficulty of wiring the electrical system of the vehicle.

At least some existing fuse blocks are configured for plug-in connection to circuitry to avoid labor intensive hard-wired connections. See for example, U.S. Pat. No. 6,431,880. Connections in such fuse blocks are made to one or more internal buses to selectively distribute electrical power to, for example, different electrical subsystems of a vehicle. The use of a second internal bus allows a user to switch a bank of relays at the same time. This type of switching can be used accomplished using either power or ground. Such fuse blocks, however, are commonly used with switching elements which must be separately wired from the fuse block so that power can be selectively switched to certain components or circuits in the electrical system. Additionally, switching elements permit convenient disconnection of associated circuits from the power source during maintenance procedures, and avoids a need to remove and reinstall fuses in vehicle environments where access to the fuses is often restrictive.

Power distribution blocks are known which may accommodate fuse, circuit breakers, and relay switches in a single package, and thus provide both overcurrent protection and convenient switching of power in a single package. One such power distribution block, sometimes referred to as a vehicle electrical center (VEC) is commercially available from Cooper/Bussmann of St. Louis, Mo. However, these power distribution blocks tend to be too large and/or too expensive for use in certain applications, and also contain features that are not necessary for many applications. For example, some specialty vehicles, construction and agricultural equipment, marine applications, and truck, bus, and RV applications do not require the sophistication of the VEC or justify the cost of such distribution blocks.

Additionally, specialty vehicles, construction and agricultural equipment, marine applications, and truck, bus, and RV applications often entail additional moisture, vibration, and contaminant issues in use which are not experienced by conventional fuse blocks or power distribution blocks for automotive applications. Thus, conventional fuse blocks and power distribution are poorly suited for certain applications.

BRIEF DESCRIPTION OF THE INVENTION

According to an exemplary embodiment, a power distribution module comprises a nonconductive body defining a terminal receptacle, a barrier seal engaged to and surrounding the body adjacent the receptacle on an exterior surface of the body, and a terminal element grid fitted within the receptacle. The grid is engaged to the body at a location interior to the barrier seal.

According to another exemplary embodiment, a power distribution module comprises a nonconductive body defining a terminal receptacle, a cover latch projection, and support buttresses flanking the latch projection. A barrier seal is engaged to and surrounds the body adjacent the receptacle on an exterior surface of the body. A protective cover is configured to enclose the terminal receptacle, and the cover comprises a sealing rim which is received between the support buttresses and an outer surface of the terminal receptacle. The buttresses prevent warping of the cover and compromising the integrity of the barrier seal.

According to yet another exemplary embodiment, a power distribution module comprises a nonconductive body defining a terminal receptacle, at least one bus bar assembly situated within the terminal receptacle, a barrier seal engaged to and surrounding the body adjacent the receptacle on an exterior surface of the body, and a protective cover configured to compress the barrier seal around a periphery of the terminal receptacle.

DETAILED DESCRIPTION OF THE INVENTION

Figure 1:
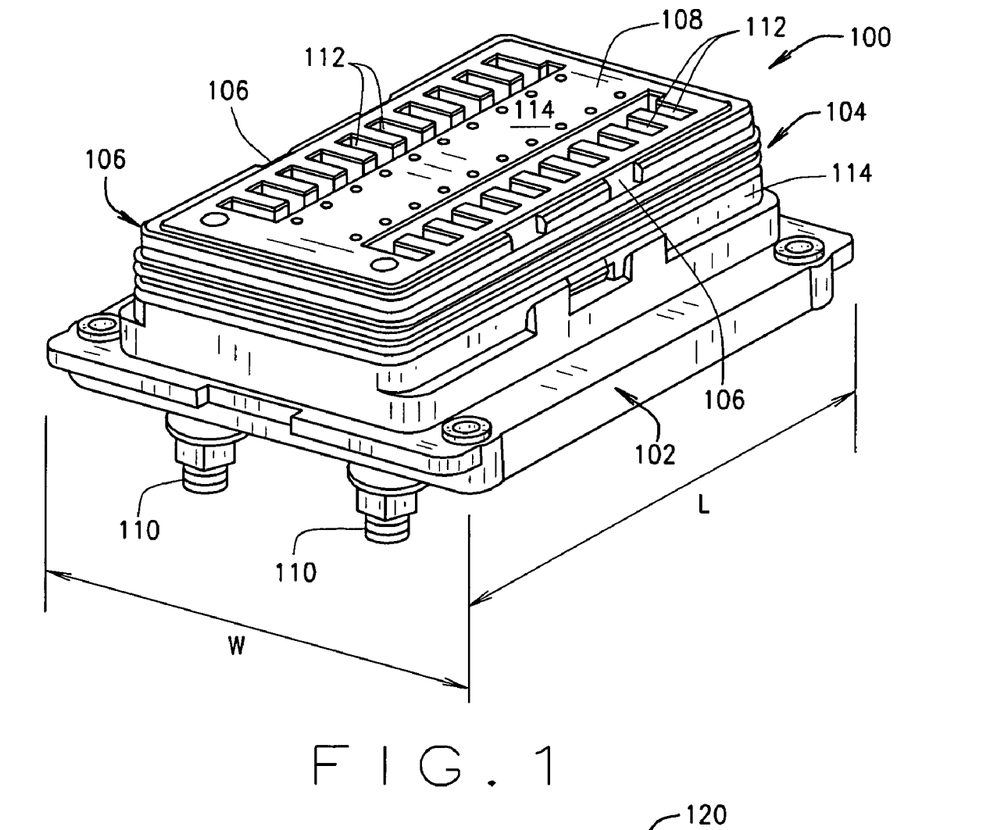
FIG. 1 illustrates an exemplary power distribution module.

FIG. 1 illustrates an exemplary power distribution module 100 in the form of a overcurrent protection block which is adapted for use in a wide range of vehicles in an economical manner and with a compact configuration. As such, the power distribution module 100 is well suited for use in, for example, specialty vehicles including construction and agricultural equipment, marine vessels and watercraft, trucks, buses, and recreational vehicles to name a few. The power distribution module 100 is provided in a compact size while providing a high component density for primary or secondary or auxiliary power distribution within an electrical system. The module 100 may be provided at relatively low cost while facilitating convenient connection to external circuitry without labor intensive hard-wired connections, and the module 100 may be suitably sealed with to withstand moisture, contaminant exposure, and vibration in use. Additionally, the module 100 may be surface mounted or panel mounted for flexible installation to vehicles. While the invention is described in the context of specialty vehicles, construction and agricultural equipment, marine vessels and watercraft, trucks, buses, and recreational vehicles, the invention is not intended to be limited to such exemplary applications.

In an exemplary embodiment, the power distribution module 100 includes a nonconductive housing base or body 102, a barrier seal 104, a nonconductive terminal element tray or grid 106 coupled to the body 102, and a grid guide cover 108 overlying the grid 106. A pair of power input or line-side input terminals 110 extend from the body 102 and are connected, respectively, to internal buses (not shown in FIG. 1 but described below) within the housing 102. In an exemplary embodiment, the line-side input terminals 110 are threaded terminal studs for increased current capacity relative to other types of terminals. It is understood, however, that other types of line-side input terminals may be employed in alternative embodiments of the invention in lieu of terminal studs.

The grid 106 and the grid guide cover 108 each include a number of overcurrent device openings or apertures 112 extending therethrough, and each of the openings 112 is dimensioned to receive an overcurrent protection device (not shown) therein. As illustrated in FIG. 1, the openings 112 are aligned in rows and columns on a top surface 114 of the grid guide cover 108. In an exemplary embodiment, the grid 106 and the guide cover 108 include twenty openings 112 divided into two groups or sets of ten openings each, and the groups of openings 112 extend generally parallel to one another on the top surface 114 of the module 100. It is understood however, that a greater or lesser number of overcurrent device openings 112 could be provided in another embodiment, and the overcurrent device openings 112 could be arranged on the top surface 114 differently than FIG. 1 illustrates. In an exemplary embodiment, the power distribution module 100 has a length L of approximately 113 mm and a width W of approximately 85 mm while including twenty overcurrent device openings 112, therefore accommodating a dense population of overcurrent protection devices in a compact size. It is contemplated, however, that the dimensions of the module 100 may vary in alternative embodiments.

Terminal elements (not shown in FIG. 1 but described below) are situated within the body 102 and the grid 106 proximate each of the overcurrent device openings 112, and the terminal elements are connected to the buses in the body to establish electrical connection to the line-side input terminals 110. Thus, when overcurrent protection devices such as fuses are inserted into the openings 112 and engaged to the terminal elements, electrical connections are completed between the line-side input terminals 110 and the respective overcurrent protection devices. Power output or load side-connections to the overcurrent protection devices may be established using known connectors to connect load-side equipment to the power distribution module 100 as further described below.

A protective cover (not shown in FIG. 1) but described below, is detachably mounted to the body 102 over the grid 106 and the grid guide cover 108 to form a protective enclosure for the overcurrent protection devices once installed to the module 100. The protective cover cooperates with the sealing barrier 104 to provide a moisture-proof seal to protect the overcurrent protection devices and the grid 106 in use and to prevent contaminants from entering the module 100. Additionally, the protective cover securely latches to the module body 102 as described below and may more capably withstand vibration and extreme operating environments than known power distribution modules.

Figure 2:
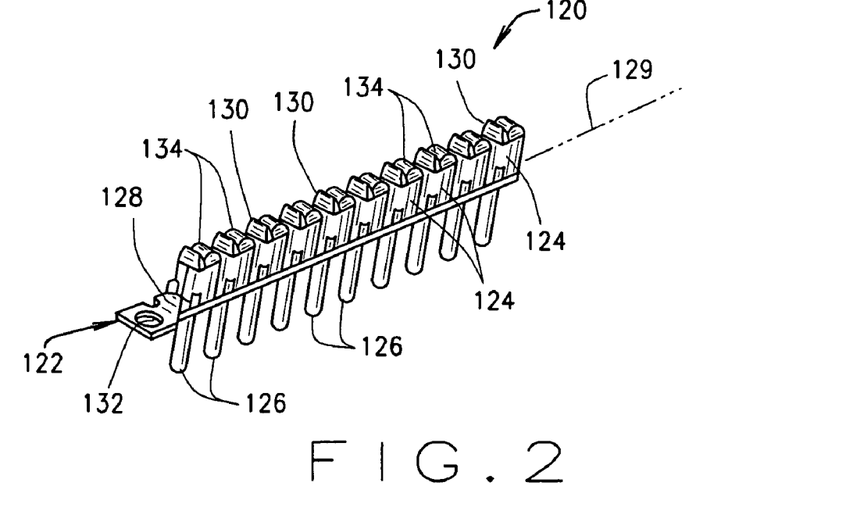
FIG. 2 illustrates an exemplary bus bar assembly for the power distribution module shown in FIG. 1.

FIG. 2 illustrates an exemplary fuse bus bar assembly 120 for the power distribution module 100 (shown in FIG. 1). The fuse bus bar assembly includes a conductive bus bar 122, terminal elements 124, and locating pins 126. The bus bar 122 includes a flat or generally planar region 128, and the region 128 is elongated and extends along a longitudinal axis 129 of the bus bar 122. The locating pins 126 include upstanding contact blades 130, and the pins 126 are press fit and soldered to the bus bar 122 so that the contact blades 130 extend along the axis 129 of the bus bar 122 and extend substantially perpendicular to the planar region 128 and above a top surface of the planar region 128. An aperture 132 is formed in the bus bar 122 at one end of the planar region 128, and the aperture 132 receives one of the input terminals 110 (shown in FIG. 1) to mechanically and electrically connect the input terminal 110 to the bus bar 122. The bus bar 122 is integrally fabricated and formed from a single piece of conductive material in an exemplary embodiment according to a known stamping and forming process, although other fabrication processes familiar to those in the art may be utilized. When the terminal elements 124 are received on the contact blades 130, the terminal elements are connected to the input terminal 110 via the bus bar 122. The terminal elements 124 provide contact pressure between the contact blades 130 and terminal elements of plug-in devices (e.g., fuses and switching elements).

In an exemplary embodiment, the terminal elements 124 are known resilient or spring terminals which engage the upstanding contact blades 130 of pins 126 and receive a power input or line-side terminal blade of a fuse. The terminal elements 124 each include a resilient or deflectable contact arm 134 in an exemplary embodiment, and when the line-side terminal blade of a fuse is inserted between the contact arms 134 and the respective contact blade 130 of the bus bar 122, the contact arm 134 clamps the terminal blade of the fuse to the contact blade 130 of the bus bar 122. The terminal elements 124 are fabricated from a sheet of conductive material in an illustrative embodiment according to a known stamping and forming process, or other fabrication processes familiar to those in the art. In alternative embodiments, the terminal elements 124 may be fabricated from nonconductive materials if desired. It is understood that the terminal elements 124 could be formed into a variety of shapes using a variety of materials in various alternative embodiments.

In one embodiment, the contact blades 130 of the bus bar 122 and the attached terminal elements 124 are uniformly spaced from one another and configured to accept, for example, 2.80 mm wide terminal blades of known ATM style automotive fuses which are commercially available from, for example, Cooper/Bussmann of St. Louis Mo. Thus, the bus bar assembly 120 is particularly well suited for fuses commonly used in vehicle applications. It is understood, however, that the contact blades 130 and the terminal elements 124 could be otherwise constructed to accept other types of fuses, and also other types of overcurrent protection devices such as circuit breakers, as desired. Additionally, while the illustrative bus bar assembly 120 of FIG. 2 includes ten contact blades 130 and ten terminal elements 124, it is appreciated that greater or fewer numbers of contact blades 130 and terminal elements 124 may be employed in alternative embodiments.

The location pins 126 extend downwardly from the planar region 128 of the bus bar 122, and the location pins 126 are received in the module body 102 (shown in FIG. 2) to properly locate the bus bar assembly 120 with respect to the body 102 during fabrication and assembly of the module 100. In an exemplary embodiment, the pins 126 are fabricated from a conductive material according to a known process and coupled to the bus bar 122 in a known manner, such as a press fit and soldered connection.

Figure 3:
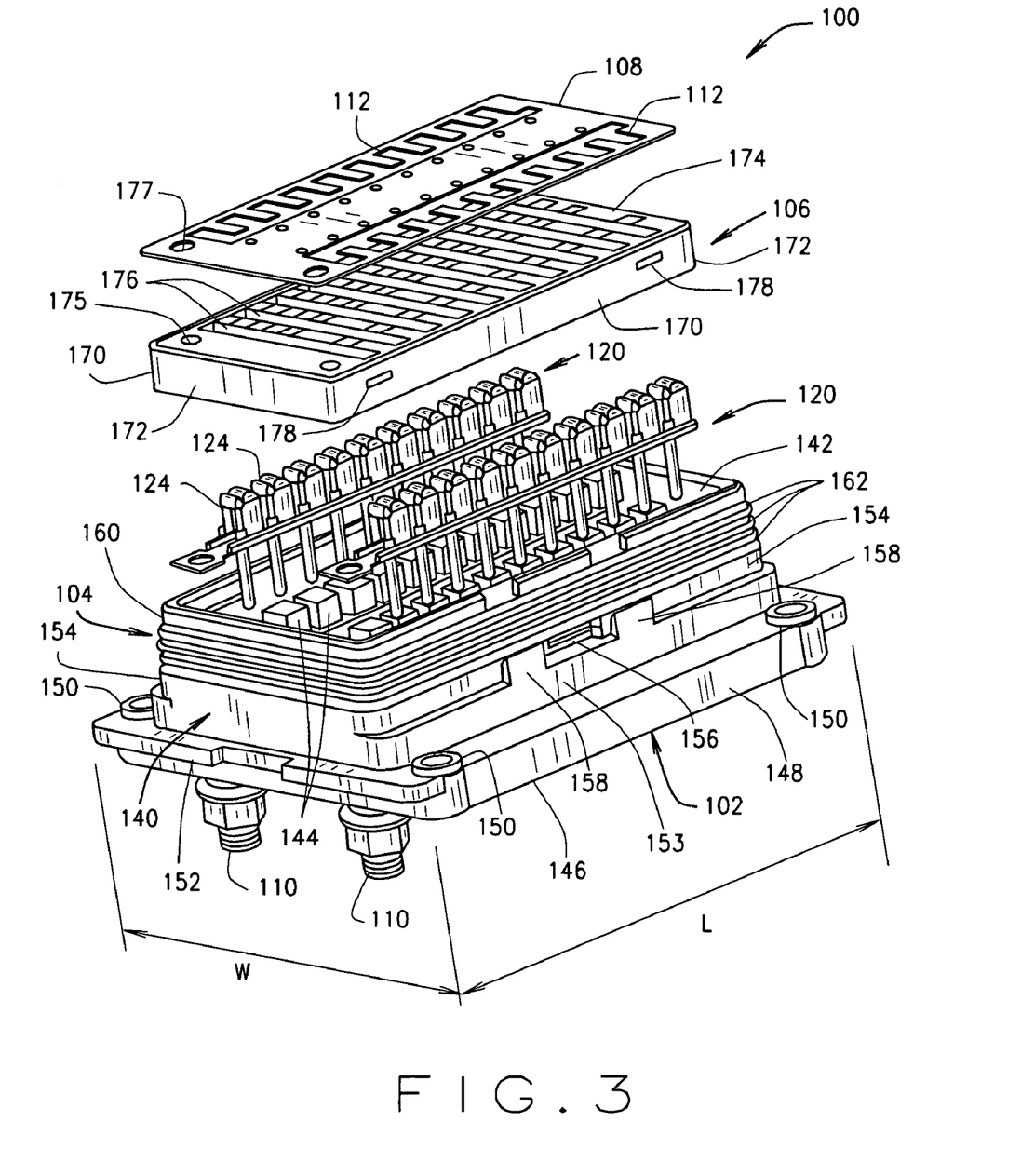
FIG. 3 is an exploded view of the power distribution module shown in FIG. 1.

FIG. 3 is an exploded view of the power distribution module 100 illustrating the body 102, the sealing barrier 104, the grid 106, the grid guide cover 108, and first and second bus bar assemblies 120 in relation to one another.

In an exemplary embodiment, the body 102 is generally rectangular and defines a rectangular terminal compartment 140 having an open ended terminal receptacle 142 on one end thereof. The bus bar assemblies 120 are received in the terminal receptacle 142 of the body 102 and aligned with one another such that the longitudinal axis 129 (FIG. 2) or each of the bus bar assemblies 120 are spaced apart but extend substantially parallel to one another within the terminal receptacle 142 and adjacent the longitudinal sides of the terminal compartment 140.

A number of connector receptacles 144 are formed in the body 102 and extend within the terminal receptacle 142 alongside the respective bus bar assemblies 120, and each connector receptacle 144 is located adjacent one of the terminal elements 124 when the bus bar assemblies 120 are installed. Thus, while each terminal element 124 accepts a power input or line-side blade terminal of an overcurrent protection device such as a fuse, the respective connector receptacle 144 receives a power output or load-side blade terminal of the overcurrent protection device. The connector receptacles 144 extend through a bottom surface 146 of the body 102 and are in communication with the terminal receptacle 142, such that plug-in connectors may be inserted through the bottom of the connector receptacles 144 to mechanically and electrically connect with the load-side terminal blades of a fuse, for instance. For example, a number of Series 280 Packard Metri-Pack™ connectors which are commercially available from Delphi/Packard Electrical Systems of Troy, Mich. may be employed to connect load-side terminals of an overcurrent protection device to output wires or cables connected to electrical components, circuitry, or equipment in the vehicle. Load-side or power output connections to the module 100 may therefore be established conveniently and quickly with snap-fit engagement. The connectors may be sealed to complement the sealing barrier 104 to moisture-proof the module 100, which can be particularly advantageous in specialty vehicle applications operated in extreme environments. Other connectors may be used in lieu of Metri-Pack™ connectors, however, in alternative embodiments.

The body 102 includes a substantially rectangular mounting flange 148 which extends laterally outward as a ledge from the side walls of the terminal compartment 140. In one embodiment, the mounting flange 148 includes threaded inserts 150 at approximately the four corners of the flange 148. When used with a mounting bracket (not shown), the inserts 150 provide for surface mounting of the module body 102 on, for example, a chassis of a vehicle with known fasteners inserted through the flange 148 and the inserts 150. Additionally, the terminal compartment 140 of the body 102 includes a mounting rim 152 extending laterally outward from the flange 148. The mounting rim 152 may be mounted to a larger panel system using the inserts 150. Thus, the power distribution module 100 may be mounted in either a surface mount configuration or a panel mount configuration to accommodate a variety of electrical systems.

A cover mount ledge 153 extends laterally outward from the longitudinal side walls of the terminal compartment 140, and a latch wall 154 is formed in an outer surface of the terminal compartment 140 adjacent the ledge 153 one each side of the terminal compartment 140. The latch wall 154 is inwardly recessed relative to the ledge 153. That is, the latch wall 154 is positioned closer to an outer surface of the terminal compartment 140 than the ledge 153. The latch wall 154 includes a cover retaining projection 156 which engages the protective cover (not shown in FIG. 3) as explained further below. The cover mount ledge 153 also includes integral supports or buttresess 158 which flank the cover retaining projection 156 on the latch wall 154.

The terminal compartment 140 is formed with a lip 160 on a top edge thereof and surrounding the outer perimeter of the terminal receptacle 142, and the lip 160 retains the barrier seal 104 between the latch walls 154 and the lip 160. In an exemplary embodiment, the barrier seal 104 is a resilient compressible material which extends continuously around the upper perimeter of the terminal compartment 140. In one embodiment, the barrier seal 104 is formed as a continuous band of elastic material (e.g., rubber) which is complementary in shape to the perimeter of the terminal compartment 140 (i.e., rectangular in the illustrated embodiment). Further, the barrier seal 104 includes a number of ribs 162 which are compressed by the protective cover as it is installed to the body 102. While the barrier seal 104 is illustrated with three ribs 162 to provide a triple barrier seal, it is contemplated that more or less ribs 162 may be employed in different embodiments to achieve varying degrees of sealing effectiveness.

The grid 106 is substantially rectangular and box-like, and is fabricated from a nonconductive material to include opposite side walls 170, opposite ends walls 172, and a top surface 174 having a number of cutouts or openings 176 extending therethrough. A number of interior grid partitions (not shown in FIG. 3) extend between the side walls 170 and the end walls 172 beneath the top surface 174. When the grid 106 is engaged to the terminal compartment 140, the grid partitions extend between the connector receptacles 144 and the terminal elements 124 in the terminal compartment 140. The side walls 170 of the grid 106 include retaining projections 178 which are snap fit into slots (not shown in FIG. 3) in the interior side walls of the terminal compartment 140. As such, the side walls 170 of the grid 106 are located interior to the terminal compartment 140 once the grid 106 is installed to the body 102, and hence the joint between the grid 106 and the terminal compartment 140 is within the confines of the sealing barrier 104 once the module 100 is assembled. Effective sealing of the module 100 is therefore ensured.

The grid guide cover 108 is fabricated from a nonconductive material in the form of a thin sheet including the overcurrent device openings 112. The grid guide cover 108 overlies the top surface 174 of the grid 106, and the openings 112 align with the openings 176 in the grid 106. The grid 106 includes locating pins or projections 175 which cooperate with retention apertures 177 in the grid guide cover 108 to align the cover 108 on the grid 106. Additionally, the grid guide cover 108 includes graphics or indicia which may be used to direct users to install or replace fuses in the module 100, and in one embodiment the grid guide cover 108 is adhered to the grid 106, although it is appreciated that the grid guide cover 108 may be attached to the grid 106 in another manner in an alternative embodiment.

The module 100 may be manufactured and assembled as follows in one exemplary embodiment. The bus bar assemblies 120 are assembled by installing the pins 126 and the terminal elements 124 to the bus bars 122, and the assemblies 120 are passed through a flux/reflow machine prior to installation into the body 102. The body 102 is molded from a non-conductive material (e.g., plastic) according to a known process, and the input terminals 110 are molded into the body 102. After molding is complete, the bus bar assemblies 120 are inserted into the terminal receptacle 142 and staked onto the terminals 110. The grid 106 is then snapped into the terminal receptacle 142, either before or after the grid guide cover 108 is installed, and the sealing barrier 104 is then installed over the outer perimeter of the terminal compartment 140 of the body 102. The power distribution module 100 is then ready for use as shown in FIG. 1, and as mentioned previously the module 100 may be panel mounted to an electrical system using the mounting flange 148 or surface mounted using an optional mounting bracket (not shown).

Once the power distribution module 100 is assembled, the power input terminals 110 may be coupled to a power source (not shown) such as a vehicle battery. Connectors (not shown), such as those described above, are inserted into the connector receptacles 144 through the bottom surface 146 of the body 102 to establish load-side connections to electrical equipment and circuitry in, for example, a vehicle electrical system. When the input terminals 110 are connected to the power source and the connectors are installed into the receptacles 144, overcurrent protection devices such as fuses may be inserted into the openings 112 in the grid guide cover 108 and through the openings 176 in the grid 106. More specifically, blade terminals of the fuses are inserted through the openings 112 and 176 such that one of the blade terminals of each fuse engages one of the contact blades 130 of the bus bar assemblies 120 and the other of the blade terminals of each fuse engages an electrical contact of one of the connectors in the corresponding connector receptacle 144. Because the blade contacts 130 are electrically connected to the respective buses 122 and the input terminals 110, each fuse completes a circuit between the power source and the associated load-side equipment and circuitry.

In accordance with known fuses, each fuse includes a fusible link or fuse element extending between the blade terminals of the fuse, and when electrical current through the fuse exceeds a predetermined limit, the fusible elements melt and opens the circuit through the respective fuse to prevent electrical damage to the load-side electrical components and circuitry connected to the power distribution module 100. Overcurrent protection for power outputs is therefore provided. Alternatively, overcurrent protection may be provided with known plug-in circuit breaker products which are commercially available.

Figure 4:
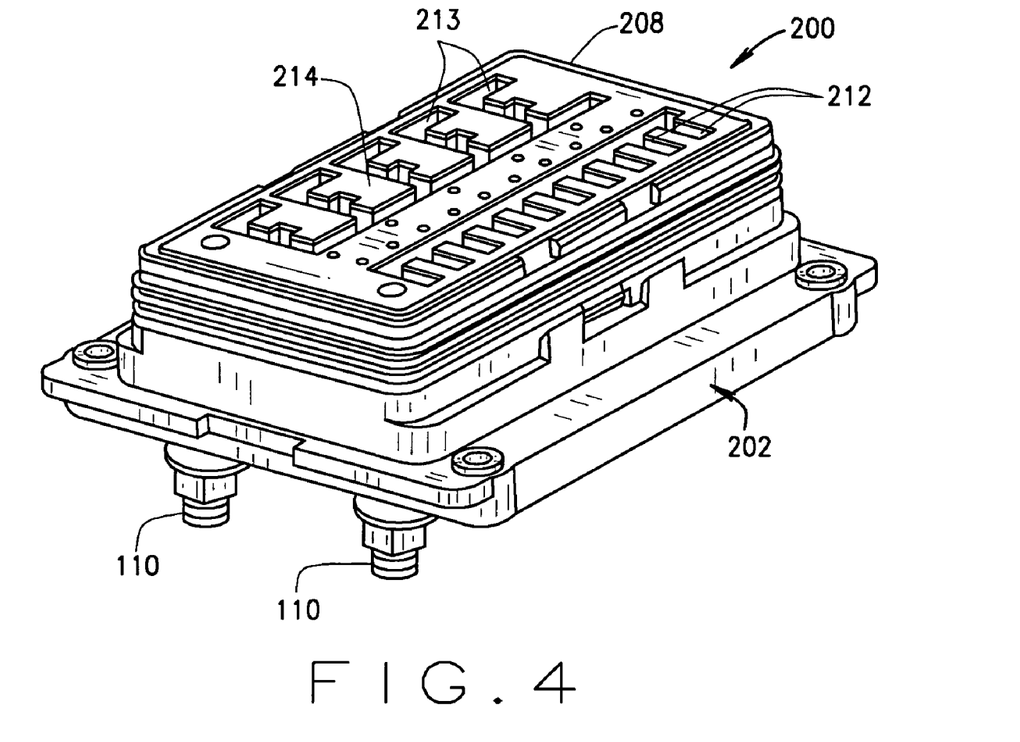
FIG. 4 illustrates another embodiment of an exemplary power distribution module.

FIG. 4 illustrates another embodiment of a power distribution module 200 which may be used in addition to or in lieu of the power distribution module 100 described above. Like the power distribution module 100, the module 200 is provided in a compact size while providing a high component density for power distribution, and the module 200 may be employed for primary or secondary or auxiliary power distribution. The module 200 may be provided at relatively low cost while facilitating convenient connection to external circuitry, and the module 200 may be suitably sealed with to withstand moisture, contaminant exposure, and vibration in use. Unlike the module 100, however, the module 200 may accommodate switching elements or switching devices as explained below.

The power distribution module 200 includes a nonconductive housing base or body 202, the barrier seal 104 as described above, a nonconductive terminal element tray or fuse grid 206 coupled to the body 202, and a grid guide cover 208 overlying the grid 206. A pair of power-input or line-side input terminals 110 extend from the body 202 and are connected, respectively, to internal buses (not shown in FIG. 4 but described below) within the body 202. In an exemplary embodiment, the line-side input terminals 110 are threaded terminal studs for increased current capacity relative to other types of terminals. It is understood, however, that other types of line-side input terminals may be employed in alternative embodiments of the invention in lieu of terminal studs.

The grid 206 and the grid guide cover 208 each include a number of overcurrent device openings or apertures 212 extending therethrough, and each of the openings 212 is dimensioned to receive, for example, a fuse, circuit breaker or other overcurrent protection device (not shown) therein. Additionally, switch element openings 213 are provided in the grid 206 and grid guide cover 208, and the switch element openings 213 are each dimensioned to receive, in one embodiment, a known relay switch package for switching power outputs from the module 200. The switch element 213 openings are accordingly sized and dimensioned differently from the overcurrent device openings 212. Once the bus bar assemblies 120 and 220 are installed, the overcurrent protection devices are electrically connected to one of the power input terminals 110, and the switching elements are electrically connected to the other of the power input terminals 110. Alternatively, the switching elements may be electrically connected to ground using one of the terminals 110.

As illustrated in FIG. 4, the overcurrent device openings 212 are aligned with one another on a top surface 214 of the grid guide cover 208, and the switch element opening 213 are aligned with one another on the top surface 214. In an exemplary embodiment, the grid 206 and the guide cover 208 include ten overcurrent device openings 212 one side of the top surface 214, and five switch element openings 213 on the other side of the top surface 214. It is understood however, that a greater or lesser number of overcurrent device openings 212 and switch element openings 213 could be provided in another embodiment, and the overcurrent device openings 212 and fuse element openings 213 could be arranged on the top surface 214 differently than FIG. 4 illustrates. In an exemplary embodiment, and like the module 100 described above, the power distribution module 200 has a length L of approximately 113 mm and a width W of approximately 85 mm. The module 200 therefore accommodates a selected combination of overcurrent protection devices and switching elements in a compact size with relatively high component density. It is contemplated, however, that the dimensions of the module 200 may vary in alternative embodiments.

Figure 5:
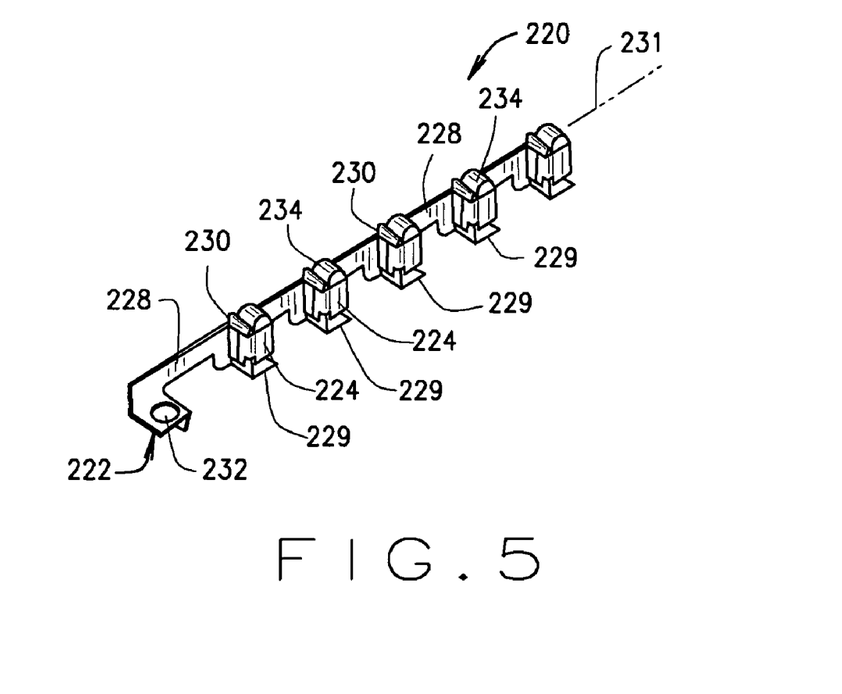
FIG. 5 illustrates a switching bus bar assembly for the power distribution module shown in FIG. 4.

FIG. 5 illustrates an exemplary switching bus bar assembly 220 for the module 200 (shown in FIG. 4) including a conductive bus bar 222 and terminal elements 224 connected to the bus bar 222. The bus bar 222 includes a flat or generally planar region 228 which is elongated and extends along a longitudinal axis 231 of the bus bar 222. Along the axis 231 of the bus bar 222, contact tabs 229 extend substantially perpendicular to the planar region 228, and upstanding contact blades 230 are formed in the contact tabs 229 and extend substantially perpendicular to the contact tabs 229 and also generally perpendicular to the planar region 228. As illustrated in FIG. 5, the contact tabs 229 lie in first plane which is perpendicular to the plane of the planar region 228 connecting the contact tabs 229, while the contact blades 230 extend generally parallel to and spaced from one another along the axis 231.

An aperture 232 is formed in the bus bar 222 at one end of the bus bar 222, and the aperture 232 receives one of the power input terminals 110 (shown in FIG. 4) to mechanically and electrically connect the power input terminal 110 to the bus bar 222. The bus bar 222 is fabricated from a sheet of conductive material according to a known stamping and forming process, or other fabrication processes familiar to those in the art.

In an exemplary embodiment, the terminal elements 224 are known resilient or spring terminals which engage the upstanding contact blades 230 of the bus bar 222 on one end and receive a switch contact (not shown) of, for example, a relay package. The terminal elements 224 each include a resilient or deflectable contact arm 234, and when the switch contact is inserted between the respective contact arms 234 of the terminal elements 224 and the contact blade 230 of the bus bar 222, the contact arm 234 clamps the switch contact to the respective contact blade 230 of the bus bar 222. The terminal elements 224 are fabricated from a sheet of conductive material in an illustrative embodiment according to a known stamping and forming process, or other fabrication processes familiar to those in the art. In alternative embodiments, the terminal elements 224 may be fabricated from nonconductive materials if desired. It is understood that the terminal elements 224 could be formed into a variety of shapes using a variety of materials in various alternative embodiments.

In one embodiment, the contact blades 230 of the bus bar 222 and the attached terminal elements 224 are uniformly spaced from one another and configured to accept, for example, 2.80 mm wide terminal blades of known commercially available relay switch packages. Thus, the bus bar assembly ,220 is particularly well suited for relay switch packages commonly used in vehicle applications. It is understood, however, that the contact blades 230 and the terminal elements 224 could be otherwise constructed to accept other types of switching elements in lieu of relay switches. Additionally, while the illustrative bus bar assembly 220 of FIG. 5 includes five contact blades 230 and five terminal elements 224, it is appreciated that greater or fewer numbers of contact blades 230 and terminal elements 224 may be employed in alternative embodiments.

Figure 6:
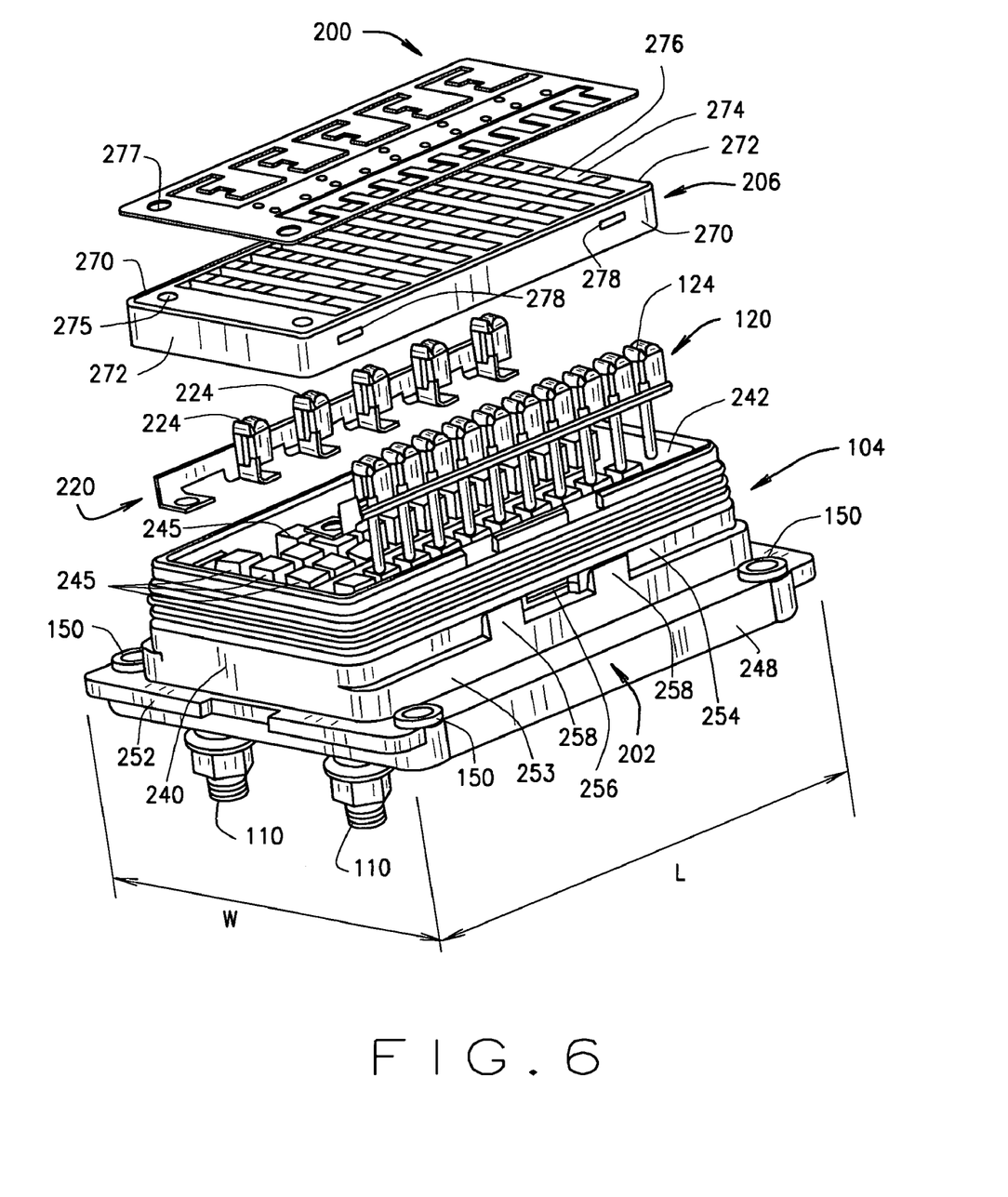
FIG. 6 is an exploded view of the power distribution module shown in FIG. 4.

FIG. 6 is an exploded view of the module 300 illustrating the body 202, the sealing barrier 104, the grid 206, the grid guide cover 208, one bus bar assembly 120 (described above in relation to FIG. 3) and one bus bar assembly 220 (FIG. 5).

In an exemplary embodiment, the body 202 is generally rectangular and defines a rectangular terminal compartment 240 having an open ended terminal receptacle 242 on one end thereof. The bus bar assemblies 120 and 220 are received in the terminal receptacle 242 of the body 202 such that the longitudinal axis 129 (FIG. 2) and 229 (FIG. 5) or the respective bus bar assemblies 120 and 220 are spaced apart but extend substantially parallel to one another within the terminal compartment 240.

A number of fuse output connector receptacles 144 are formed in the body 202 and extend within the terminal receptacle 242 alongside the fuse bus bar assembly 120 in the manner described above in relation to FIG. 3. Each terminal element 124 of the bus bar assembly 120 accepts a line-side blade terminal of an overcurrent protection device such as a fuse, and the respective connector receptacle 144 receives a load-side blade terminal of the fuse. Known plug-in connectors may be inserted through the bottom of the connector receptacles 144 to mechanically and electrically connect with the load-side terminal blades of the fuses. In particular, Series 280 Packard Metri-Pack™ connectors coupled to an output wire or cable connected to electrical components, circuitry, or equipment in the vehicle may be used. Load-side or power output connections to fuses in the module 200 may therefore be established conveniently and quickly with snap-fit engagement. Sealed connectors may be employed to complement the sealing barrier 104 to moisture-proof the module 200 for demanding operating environments of specialty vehicles. Other connectors may be used in lieu of Metri-Pack™ connectors, however, in alternative embodiments.

Additionally, a number of switch output connector receptacles 245 are formed in the body 202 and extend within the terminal receptacle 242 alongside the switching bus bar assembly 220. Each terminal element 224 of the bus bar assembly 220 accepts a power input or line-side contact of the relay switch package, and the respective connector receptacles 245 receives power output and switching control contacts for the relay switch package. Known plug-in connectors may be inserted through the bottom of the connector receptacles 245 to mechanically and electrically connect the relay switch package control inputs and power outputs. In particular, Series 280 Packard Metri-Pack™ connectors may be used. Connections to relay switch packages in the module 200 may therefore be established conveniently and quickly with snap-fit engagement. The connectors may be sealed to complement the sealing barrier 104 to moisture-proof the module 200.

The body 202 includes a mounting flange 248 which extends laterally outward as a ledge from the terminal compartment 240. In one embodiment, the mounting flange 248 includes threaded inserts 150 at approximately the four corners of the flange 248. When used with a mounting bracket (not shown), the inserts 150 provide for surface mounting of the module body 102 on, for example, a chassis of a vehicle with known fasteners. Additionally, the terminal compartment 240 of the body 202 includes a mounting rim 252 which may be engaged to a larger panel system (not shown) in a known manner. Thus, the module 200 may be mounted in either a surface mount configuration or a panel mount configuration to accommodate a variety of electrical systems.

A cover mount ledge 253 is formed on a lower outer surface of the terminal compartment 240, and a latch wall 254 is formed in the body 202 adjacent the cover mount ledge 253 on each side of the terminal compartment 240. The latch wall 254 is inwardly recessed relative to the cover mount ledge 253. That is, the latch wall 254 is positioned closer to an outer surface of the terminal compartment 240 than the cover mount ledge 253. The latch wall 254 includes a cover retaining projection 256 on each side of the terminal compartment 240 which engages the protective cover (not shown in FIG. 6) as explained further below. The cover mount ledge 253 also includes integral supports or buttresses 258 which flank the cover retaining projection 256 on the latch wall 254.

The terminal compartment 240 is formed with a lip 260 on a top edge thereof and surrounding the terminal receptacle 242, and the lip 260 retains the barrier seal 104 between the latch walls 254 and the lip 260.

The grid 206 is substantially rectangular and box-like, and is fabricated from a nonconductive material to include opposite side walls 270, opposite ends walls 272, and a top surface 274 having a number of cutouts or openings 276 extending therethrough. A number of interior grid partitions (not shown in FIG. 6) extend between the side walls 270 and the end walls 272 beneath the top surface 274. When the grid 206 is engaged to the terminal compartment 240, the grid partitions extend between the connector receptacles 244 and the terminal elements 224 in the terminal receptacle 242. The side walls 270 of the grid 206 include retaining projections 278 which are snap fit into slots (not shown in FIG. 6) in the terminal compartment 240 when the grid 206 is slid downward into the terminal receptacle 242 over the bus bar assemblies 120 and 220. Notably, the side walls 270 of the grid 206 are located interior to the terminal receptacle 242 once the grid 206 is installed, and hence the joint between the grid 206 and the terminal compartment 240 is within the confines of the sealing barrier 104 once the module 200 is assembled. Effective sealing of the module 200 is therefore ensured in a top end of the power distribution module 200. Sealed terminals, plug connectors and the like may be used on the bottom end of the module 200 to seal the bottom surface of the module 200, and when so employed the module 200 is well suited for demanding operating environments of specialty vehicles.

The grid guide cover 208 is fabricated from a nonconductive material in the form a thin sheet including the overcurrent device openings 212 and the switch element openings 213. The grid guide cover 208 overlies the top surface 274 of the grid 206, and the openings 212 and 213 align with the openings 276 in the grid 206. The grid 206 includes locating pins or projections 275 which cooperate with retention apertures 277 in the grid guide cover 208 to align the cover 208 on the grid 206. The grid guide cover 208 includes reference graphics or indicia which may facilitate install or remove of overcurrent protection devices (e.g., fuses or circuit breakers) and switching devices in the module 200. In one embodiment the grid guide cover 208 is adhered to the grid 206, although it is appreciated that the grid guide cover 208 may be attached to the grid 206 in another manner in an alternative embodiment.

The module 200 may be manufactured and assembled as follows in one exemplary embodiment. The bus bar assemblies 120 and 220 are assembled and the assemblies 120 and 220 are passed through a flux/reflow machine prior to installation into the body 202. The body 202 is molded from a non-conductive material (e.g., plastic) according to a known process, and the input terminals 110 are molded into the body 202. After molding is complete, the bus bar assemblies 120 and 220 are inserted into the terminal receptacle 242 and staked onto the respective terminals 110. The grid 206 is then snapped into the terminal receptacle 242, either before or after the grid guide cover 208 is installed, and the sealing barrier 104 is then installed over the outer perimeter of the terminal compartment 240 of the body 202. The module 200 is then ready for use as shown in FIG. 4, and as mentioned previously may be surface mounted or panel mounted to an electrical system.

Once the module 200 is assembled, the input terminal 110 corresponding to the fuse bus bar assembly 120 (FIG. 6) may be coupled to a power source (not shown) such as a vehicle battery. The other terminal 110 corresponding to the switching bus bar assembly 220 (FIG. 6) may be coupled to a power source or to ground as desired. Fuse output connectors (not shown) are inserted into the connector receptacles 244 through the bottom surface 246 of the body 202 to establish fused output or load-side connections to electrical equipment and circuitry in, for example, a vehicle electrical system. When the input terminal 110 for the fuse bus bar assembly 120 is connected to the power source and the connectors are installed into the receptacles 144, fuses may be inserted into the openings 212 in the grid guide cover 208 and through the openings 276 in the grid 206. Blade terminals of the fuses are inserted through the openings 212 and 276 such that one of the blade terminals of each fuse engages one of the contact blades 130 (FIG. 2) and the other of the blade terminals of each fuse engages an electrical contact of one of the connectors in the corresponding connector receptacle 144. Because the contact blades 130 are electrically connected to the bus bar 122 and one of the input terminals 110, each fuse completes a circuit between the power source and the associated load-side equipment and circuitry. In an alternative embodiment, circuit breakers may be used in lieu of fuses.

Switch output and control connectors (not shown) are inserted into the switch connector receptacles 245 through the bottom surface 246 of the body 202 to establish switch control and switch output or load-side connections to electrical equipment and circuitry in, for example, a vehicle electrical system. When the input terminal 110 of the switch bus bar assembly is connected to the power source and the connectors are installed into the receptacles 245, the relay switch packages may be inserted into the switch openings 213 in the grid guide cover 208 and through the openings 276 in the grid 206. The respective contacts of the switch package are inserted through the openings 213 and 276 to establish electrical contact with the bus bar 222 and control and output circuitry. Because the contact blades 230 of the switching bus bar assembly 220 are electrically connected to the bus bar 222, each switch package completes a circuit between the power source and the associated load-side equipment and circuitry.

Fused power distribution and switching is therefore conveniently provided in a single, compact package with plug-in connections. The module 200 may also be manufactured and assembled in an economical manner and at lower cost than known power distribution blocks which have integrated overcurrent protection and switching capability. By providing a dedicated bus bar for switching purposes, the switch packages (e.g., relay switches) may be operated independently or simultaneously for user convenience, and further without affecting the fuse bus bar assembly 120 and the fused connections to the module 200.

Figure 7:
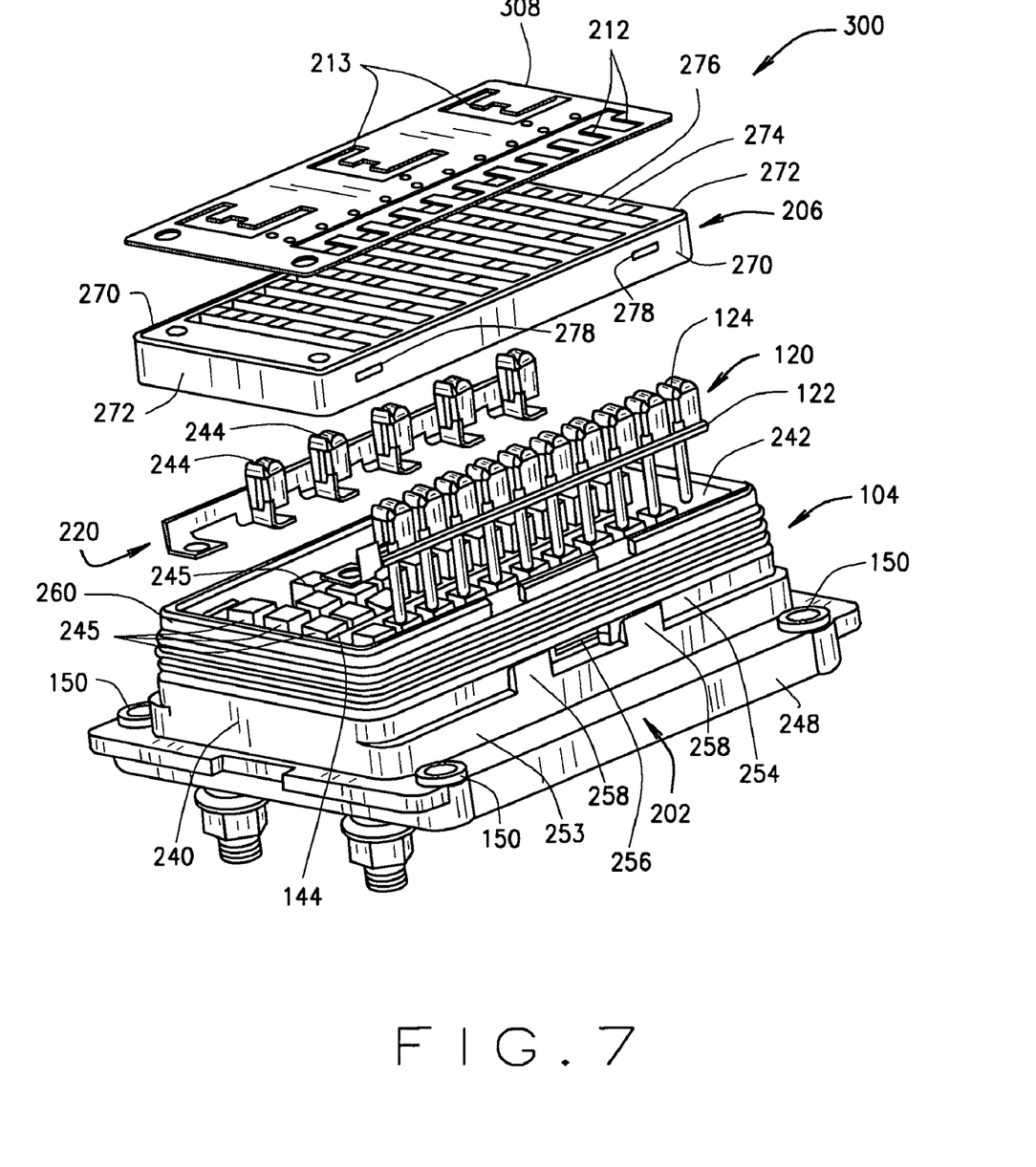
FIG. 7 illustrates another embodiment of a power distribution module.

FIG. 7 is an exploded view of another embodiment of a power distribution module 300 which is similar to the module 200 in most aspects, and in which like reference numbers of the module 200 are indicated with like reference characters in FIG. 7. As may be seen from FIG. 7, the module 300 includes a grid guide cover 308 which includes a fewer number of switch openings 213 than the switching terminal elements 224 of the switching bus bar assembly 220. Thus, as shown in FIG. 7, the switching bus bar assembly 220 includes five terminal elements 224 while the grid guide cover 308 includes only three switch element openings 213, and the grid guide cover 308 therefore prevents switching packages from engaging two of the terminal elements 224. In such a manner, different grid guide covers may be used with a standardized internal construction of the module 200 to present different fuse and switch element mounting interfaces for different applications. Thus, power distribution modules can be tailored to different users in a low cost manner by simply changing the grid guide cover 308 to provide different numbers of switch element openings 213 and/or overcurrent device openings 212.

Figure 8:
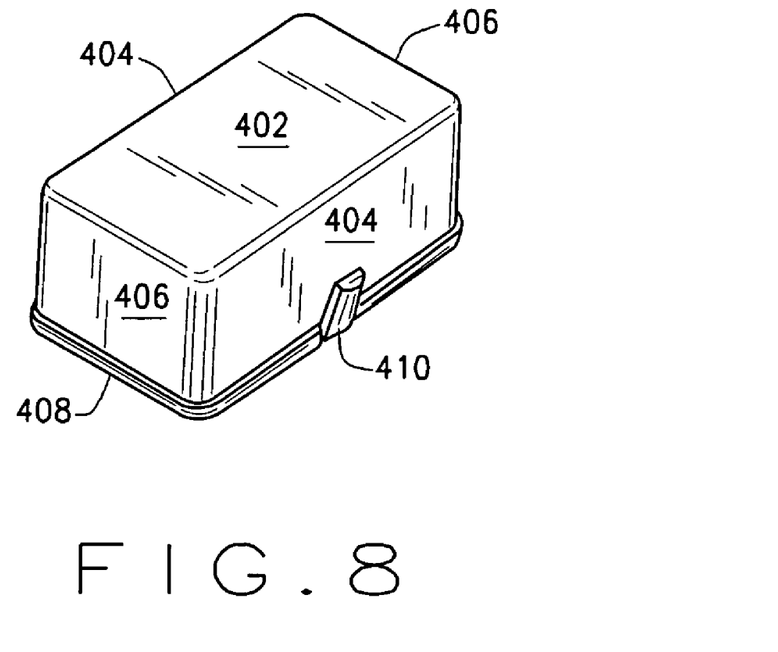
FIG. 8 illustrates a protective cover for the power distribution modules shown in FIGS. 1, 4, and 7.

FIG. 8 illustrates a protective cover 400 which may be used with the foregoing power distribution blocks 100 (FIGS. 1–3), 200 (FIGS. 3–6) and 300 (FIG. 7). The cover 400 is fabricated from a nonconductive material such as plastic, and includes a top wall 402, longitudinal side walls 404 extending downwardly from the top wall 402, and lateral side walls 406 extending downwardly from the top wall 402 and interconnecting the longitudinal side walls 404. The top wall 402 and the side walls 404 and 406 are arranged in a substantially rectangular or box-like shape with a hollow interior sized and dimensioned to receive the terminal compartments 140 (FIG. 3), or 240 (FIGS. 6 and 7) and to form a protective enclosure over fuses and/or relay switch packages in the modules 100, 200 or 300.

A lower periphery of the cover 400 includes an integrally formed sealing rim 408 which extends slightly outward from the outer surfaces of the side walls 404 and 406, and cover latch arms 410 extend from the longitudinal side walls 404, and are approximately equidistant from the lateral side walls 406. In one embodiment, the latch arms 410 are substantially rectangular in shape and extend obliquely to the longitudinal side walls 404 and to the top wall 402 of the cover 400. The latch arms 410 are integrally formed into the cover 400 and facilitate engagement and disengagement of the cover 400 from the latch projections 156 (FIG. 3) and the latch projections 256 (FIGS. 6 and 7). In an exemplary embodiment, the cover is fabricated from, for example, plastic, according to a known molding process, and the latches are resiliently deflectable relative to the side walls 404 of the cover 400.

Figure 9:
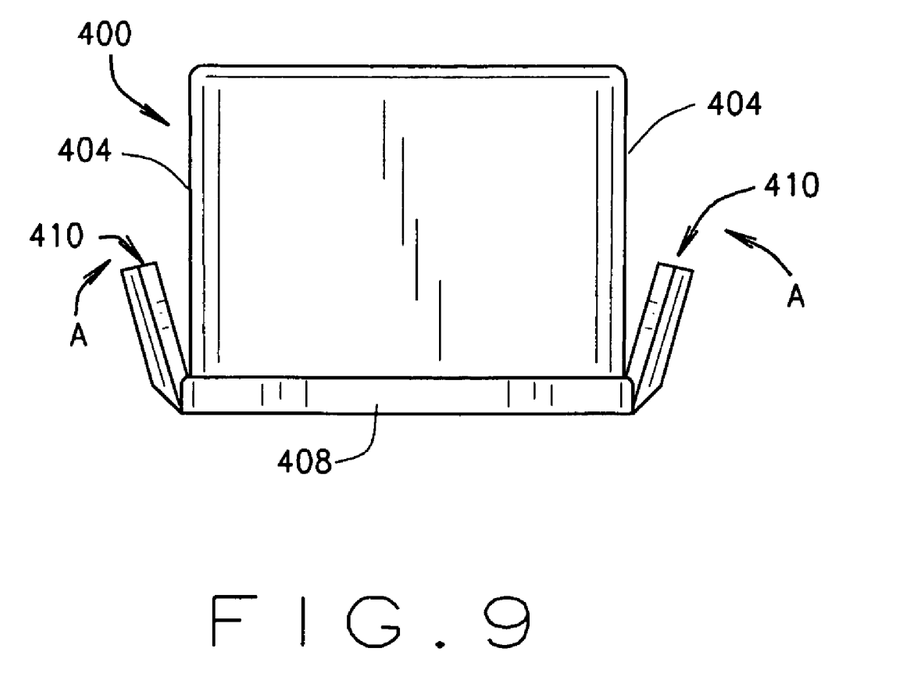
FIG. 9 is an end view of the cover shown in FIG. 8.

FIG. 9 is an end view of the cover 400 illustrating the latch arms 410 extending at an angle to the side walls 404 adjacent the sealing rim 408. When the cover 400 is installed to the modules 100, 200, or 300, the latch arms 410 snap over the latch projections 156 (FIG. 3) and the latch projections 256 (FIGS. 6 and 7), and the sealing rim 408 is received between the latch walls 154 (FIG. 3) and 254 (FIGS. 6 and 7) and the buttresses 158 (FIG. 3) and 258 (FIGS. 6 and 7). The buttresses 158 and 258 retain the cover rim 408 and prevent warping of the cover which could degrade or compromise the integrity of the seal. The sealing barrier 104 (FIGS. 3, 6, and 7) is compressed to form a secure, moisture-proof seal. The latch arms 410 may be compressed in the direction of Arrow A in FIG. 9 to deflect the side walls 404 at the lower edges and remove the cover 400 from the module.

Figure 10:
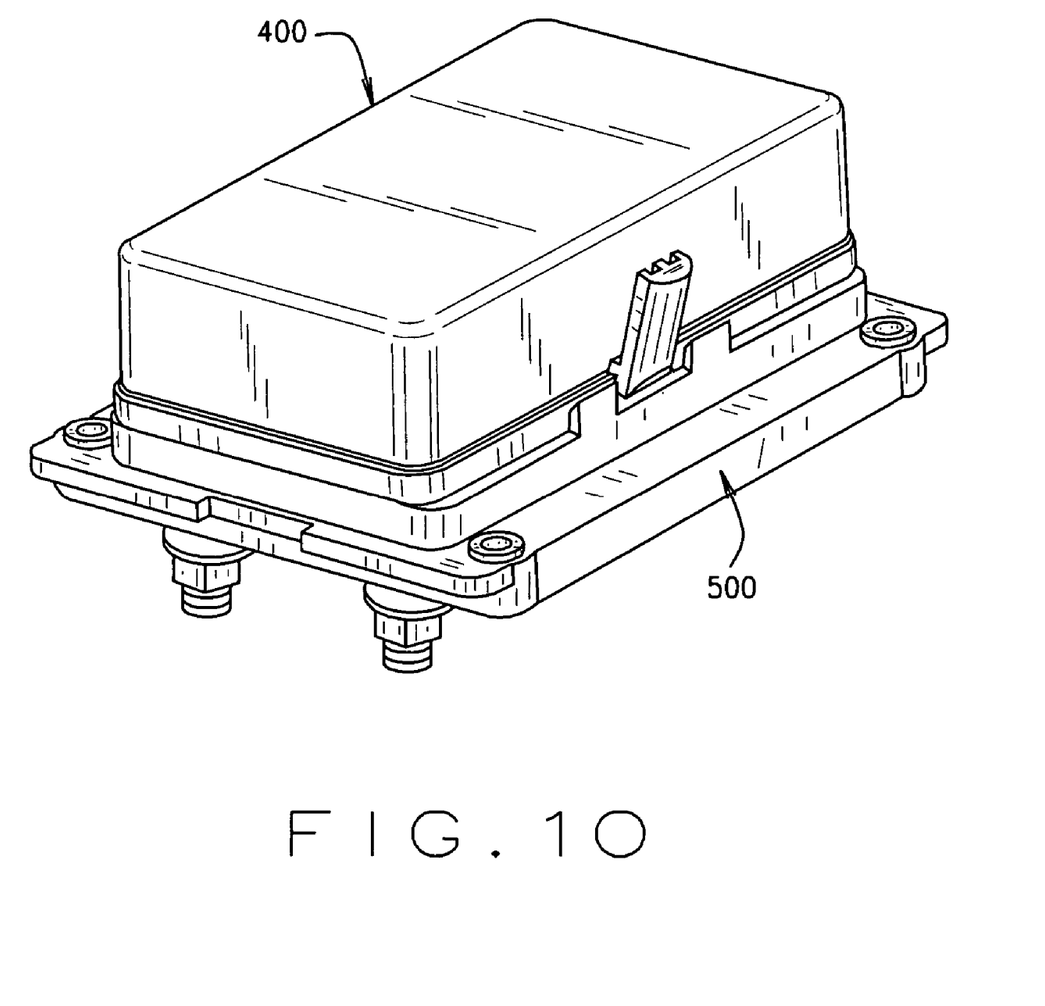
FIG. 10 illustrates the cover shown in FIGS. 8 and 9 attached to a power distribution module.

FIG. 10 illustrates the cover 400 in an installed position on a power distribution module 500, which may be any of the foregoing modules 100, 200 or 300. The cover 400 is securely latched to the module 500 and will not easily separate from the module 500. The cover 400 is therefore well suited to withstand vibration which is commonly incurred for, example, in watercraft and construction or agricultural equipment. The barrier seal 104 (FIGS. 1, 3, 4, 6 and 7) provides a triple redundant seal to protect overcurrent protection devices and/or switch packages used in the module 500.

In further alternative embodiment, the above described sealing cover 400 and sealing features in the modules 100, 200 and 300 may be employed in modules without having the above-described internal bus bar assemblies. As such, sealed enclosures may be provided for fuses, switching elements such as relays, circuit breakers, diodes, resistors, and flasher elements, to name a few, which may be employed in, for example, a vehicle electrical system. When used with commercially available sealed terminals and connectors, such a module may be beneficial even without the above-described bus bar assemblies, and may be particularly advantageous when used with specialty vehicles.

While the invention has been described in terms of various specific embodiments, those skilled in the art will recognize that the invention can be practiced with modification within the spirit and scope of the claims.

What is claimed is:

1. A power distribution module comprising:
   a nonconductive body defining a terminal receptacle, said nonconductive body comprising a cover mount ledge extending outward from longitudinal side walls of said nonconductive body and a latch wall extending outward from the longitudinal side walls of said nonconductive body;
   a terminal element mounted to said body in a fixed relationship to said terminal receptacle;
   a barrier seal engaged to and surrounding said terminal receptacle, the barrier seal extending on an exterior surface of the terminal receptacle of said body and mounted in a fixed relationship to said terminal receptacle; and
   a terminal element grid fitted within said terminal receptacle, said grid engaged to said body at a location interior to said barrier seal;
   wherein said latch wall is inwardly recessed relative to said cover mount ledge, said cover mount ledge includes first and second support buttresses, said latch wall includes a latch projection for engaging a cover, and said first and second support buttresses flanking said latch projection.

2. A module in accordance with claim 1, wherein the cover is configured to enclose said terminal receptacle and said terminal element grid, the protective cover surrounding and compressing said barrier seal.

3. A module in accordance with claim 2, wherein the cover comprises at least one side wall and a latch arm integrally formed with said side wall, said latch arm extending obliquely from a lower periphery of said side wall and deflectable relative to said side wall to latch or unlatch the cover from said body.

4. A module in accordance with claim 1 wherein said barrier seal comprises a plurality of ribs, said barrier seal compressed by an inner surface of the cover when the cover is engaged to said body.

5. A power distribution module in accordance with claim 1 further comprising at least one bus bar assembly located in said terminal receptacle.

6. A power distribution module in accordance with claim 1 wherein said body is adapted for surface mounting and panel mounting.

7. A power distribution module in accordance with claim 1 wherein said grid is configured to accommodate overcurrent protection devices and switching elements.

8. A power distribution module comprising:
   a nonconductive body defining a terminal receptacle, said nonconductive body comprising a cover mount ledge extending outward from longitudinal side walls of said nonconductive body and a latch wall extending outward from the longitudinal side walls of said nonconductive body;
   a terminal element mounted to said body in a fixed relationship to said terminal receptacle;
   a barrier seal engaged to and surrounding said terminal receptacle, the barrier seal extending on an exterior surface of the terminal receptacle of said body and mounted in a fixed relationship to said terminal receptacle; and
   a terminal element grid fitted within said terminal receptacle, said grid engaged to said body at a location interior to said barrier seal;
   wherein said latch wall is inwardly recessed relative to said cover mount ledge, said cover mount ledge includes first and second support buttresses, said latch wall includes a latch projection for engaging a cover, and said first and second support buttresses flanking said latch projection; and
   wherein said module further comprises a first bus bar assembly configured for connection to overcurrent protection devices and having a first number of contact blades, and a second bus bar assembly configured for connection to switch packages.

9. A power distribution module in accordance with claim 8 wherein said first number of contact blades is different from said second number of contact blades.

10. A power distribution module comprising:
    a nonconductive body defining a terminal receptacle, said conductive body comprising a cover mount ledge extending outward from longitudinal side walls of said nonconductive body and a latch wall extending outward from the longitudinal side walls of said nonconductive body, wherein said latch wall is inwardly recessed relative to said cover mount ledge, said cover mount ledge includes first and second support buttresses, said latch wall includes a latch projection, and said first and second support buttresses flanking said latch projection;

a barrier seal engaged to and surrounding said body adjacent said receptacle on an exterior surface of said body, and a protective cover configured to enclose said terminal receptacle, said cover comprising a sealing rim which is received between said support buttresses and an outer surface of said terminal receptacle, said buttresses preventing warping of said cover and compromising integrity of said barrier seal.

11. A power distribution module in accordance with claim 10 wherein said cover comprises at least one side wall and a latch arm integrally formed with said side wall, said latch arm extending obliquely from said side wall and deflectable relative to said wall to latch or unlatch said latch arm from said latch projection.

12. A power distribution module in accordance with claim 10 wherein said barrier seal comprises a plurality of ribs surrounding an outer perimeter of said terminal receptacle.

13. A power distribution module in accordance with claim 10 further comprising at least one bus bar assembly within said terminal receptacle.

14. A power distribution module in accordance with claim 10 wherein said terminal element grid is configured to receive switching devices and overcurrent protection devices.

15. A power distribution module in accordance with claim 10 wherein said body is configured for surface mounting and configured for panel mounting.

16. A power distribution module comprising:
a nonconductive body defining a terminal receptacle, said nonconductive body comprising a cover mount ledge extending outward from longitudinal side walls of said nonconductive body and a latch wall extending outward from the longitudinal side walls of said nonconductive body, wherein said latch wall is inwardly recessed relative to said cover mount ledge, said cover mount ledge includes first and second support buttresses, said latch wall includes a latch projection, and said first and second support buttresses flanking said latch projection;

at least one bus bar assembly situated within said terminal receptacle;

a barrier seal engaged to and surrounding said body adjacent said receptacle on an exterior surface of said body; and a protective cover configured to enclose and compress said barrier seal around a periphery of said terminal receptacle, the cover comprising a sealing rim;

wherein said buttresses receiving said sealing rim and preventing warping of said cover.

17. A power distribution module in accordance with claim 16 further comprising a terminal grid engaged to an interior of said terminal receptacle at a location within said barrier seal.

18. A power distribution module in accordance with claim 16 wherein said protective cover is configured to enclose said terminal receptacle, said cover comprising a sealing rim.

19. A power distribution module in accordance with claim 16 wherein said cover comprises at least one side wall and a latch arm integrally formed with said side wall, said latch arm extending obliquely from said side wall and deflectable relative to said wall to latch or unlatch said latch arm from said body.

20. A power distribution module in accordance with claim 16 wherein said terminal element grid is configured to receive switching devices and overcurrent protection devices.

21. A power distribution module in accordance with claim 16 wherein said body is configured for surface mounting and configured for panel mounting.

* * * * *

UNITED STATES PATENT AND TRADEMARK OFFICE
CERTIFICATE OF CORRECTION

PATENT NO. : 7,396,262 B2 Page 1 of 1
APPLICATION NO. : 11/010229
DATED : July 8, 2008
INVENTOR(S) : Korczynski et al.

It is certified that error appears in the above-identified patent and that said Letters Patent is hereby corrected as shown below:

In Claim 10, Column 14, Lines 63-64, the word "conductive" should instead read --nonconductive--, as follows:

"...receptacle, said nonconductive body comprising a cover mount ledge..."

Signed and Sealed this

Twenty-sixth Day of August, 2008

JON W. DUDAS
*Director of the United States Patent and Trademark Office*